United States Patent Office 3,645,984
Patented Feb. 29, 1972

3,645,984
NOVEL ACRYLIC MONOMERS, THEIR PREPARATION AND TREATMENT
Rostyslaw Dowbenko and Roger M. Christenson, Gibsonia, Pa., assignors to PPG Industries, Inc., Pittsburgh, Pa.
No Drawing. Filed Apr. 30, 1969, Ser. No. 820,672
Int. Cl. C08f *3/50;* C07c *69/52*
U.S. Cl. 260—78.4
23 Claims

ABSTRACT OF THE DISCLOSURE

A novel acrylic monomer is prepared by reacting a diol such as

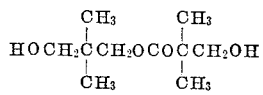

with a acrylic or methacrylic acid or their anhydrides or acid chlorides. The reaction product is a monomer which may be polymerized by subjecting it to ionizing irradiation, actinic light, or to free-radical catalysts, and the resulting polymer is a hard, mar-resistant material.

---

This invention in general deals with novel compounds which are highly radiation-sensitive. The novel compounds are acrylic monomers which when subjected to low doses of ionizing irradiation or actinic light, or to free-radical catalysts polymerize to form extremely strong and stain-resistant materials. These cured materials show excellent resistance to the most stringent staining tests and are scratch-resistant and mar-resistant.

The novel compounds produced in accordance with this invention are acrylic monomers having the formula

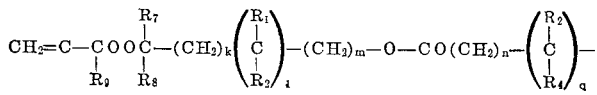

wherein $R_1$, $R_2$, $R_3$, and $R_4$ are selected from the group consisting essentially of H, alkyl, aryl, and cycloalkyl, substituted alkyl substituted aryl and substituted cycloalkyl groups. The alkyl groups may be of any length but the preferred alkyl radicals contain from 1 to 8 carbon atoms such as methyl, ethyl, isopropyl, hexyl, octyl, and the like. The preferred cycloalkyl groups contain from 5 to 8 carbon atoms such as cyclopentyl, cyclohexyl, cycloheptyl and cyclooctyl. The preferred aryl groups contain up to 8 carbon atoms such as phenyl, benzyl, and the like. The alkyl, cycloalkyl and aryl radicals may also be substituted with halogens, hydroxyls, etc. Examples of these radicals are chloropropyl, bromobenzyl, chlorocyclopentyl, hydroxyethyl, chlorooctyl, chlorophenyl, bromophenyl, hydroxy phenyl, and the like.

The radicals $R_5$, $R_6$, $R_7$ and $R_8$ are selected from the group consisting of H, alkyl, aryl, and cycloalkyl. Examples of the alkyl, cycloalkyl, and aryl radicals which may apply are given above under the discussion of $R_1$, $R_2$, $R_3$, and $R_4$.

The radicals $R_9$ and $R_{10}$ are selected from the group consisting of H, alkyl groups containing from 1 to 2 carbon atoms, halo-substituted alkyl groups containing from 1 to 2 carbon atoms, and halogen. Examples are methyl, ethyl, bromo-ethyl, and chlorine.

It is noted that although $R_1$, $R_2$, $R_3$, $R_4$, $R_5$, $R_6$, $R_7$, $R_8$, $R_9$ and $R_{10}$ may be the same radicals, each one of them may be different from the other as long as they fall under the general definition for each. That is to say, that while $R_1$ and $R_2$ may be H, $R_3$ may be ethyl, $R_4$ may be pentyl, $R_5$ and $R_6$ may be cyclohexyl, etc.

$k$, $l$, $m$, $n$, $q$ and $p$ are whole numbers having values from 0 to 5.

The preferred novel compounds are those that contain the neopentyl type structures, for example, those wherein $R_1$, $R_2$, $R_3$ and $R_4$ are lower alkyl groups, such as methyl, ethyl and propyl, and $R_5$, $R_6$, $R_7$, and $R_8$ are H, and $p$ and $k$ are 0, $l$ and $q$ are 1, and $m$ and $n$ have values of 1 or 2. It has been found that these compounds exhibit the most durable and weather-resistant properties.

The most preferable compound having this structure is acryloxypivalyl acryloxypivalate, in which $R_1$, $R_2$, $R_3$, $R_4$ are $CH_3$ radicals and $R_5$, $R_6$, $R_7$, $R_8$, $R_9$, and $R_{10}$ are H and $m$, $l$, and $q$ are 1 and $k$, $n$ and $p$ are 0.

Examples of other compounds having the above structures are methacryloxypivalyl methacryloxypivalate where $R_1$, $R_2$, $R_3$, $R_4$, $R_9$, and $R_{10}$ are $CH_3$ radicals and $R_5$, $R_6$, $R_7$, and $R_8$ are H and $l$, $m$, and $q$ are 1 and $k$, $n$, and $p$ are 0, 4-acryloxybutyl 4-acryloxybutyrate where $R_1$ to $R_{10}$ are H and $l$ and $q$ are 1, $k$ and $p$ are 2 and $m$ and $n$ are 0, acryloxypivalyl 4-acryloxybutyrate where $R_5$ to $R_{10}$ are H, $R_1$ and $R_2$ are $CH_3$. $k$ and $q$ are 0, $l$, $m$, and $p$ are 1 and $n$ is 2, 2-acryloxyethyl acryloxypivalate where $R_5$ to $R_{10}$ are H and $R_3$ and $R_4$ are $CH_3$. $k$ and $q$ are 1 and $l$, $m$, $n$, and $p$ are 0.

It is noted that mixtures of any two or more of the above compounds are also intended to be included by the above formula.

The novel compounds described above may be formed by reacting a compound selected from the group consisting of acrylic acid, methacrylic acid, acrylic anhydride, methacrylic anhydride, and acid halides of acrylic and methacrylic acid or mixtures of any of these acidic acrylic compounds with a diol having the general formula:

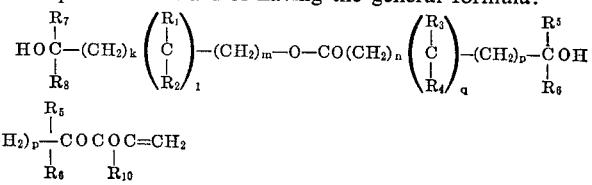

wherein $R_1$ to $R_8$, $k$, $l$, $m$, $n$, $q$ and $p$ are described above. The preferred reactants are acrylic and methacrylic acids as the acidic components and hydroxypivalyl hydroxypivalate as the diol.

The reaction is generally carried out at temperatures from about 50° C. to about 150° C. and preferably from about 95° C. to about 100° C. The molar ratio of acidic compound to diol is about 2:1 to about 10:1. It is preferred, however, to use from about 2 to about 2.5 mols of acidic component for every mol of diol.

The reaction is run in the presence of an acid catalyst such as sulfuric acid, p-toluenesulfonic acid, phosphoric acid, hydrochloric acid, and the like. The catalyst usually comprises from about 0.1 percent to about 5 percent by weight of the reactants.

In most cases a free-radical inhibitor is also used to prevent the reactants from gelling. Any free-radical inhibitor may be used such as hydroquinone, methylquinone, p-methoxyphenol, and the like. The inhibitor comprises from about 0.1 percent to about 5 percent by weight of the reactants.

The reaction is carried out by adding the diol, a portion of the acidic component, the catalyst, and the inhibitor and heating. It is highly desirable that the acidic component be added to the composition incrementally. Up to about 50 percent of the total amount of acidic component may be added with the diol but the remainder of the acidic component should be added over a period of time. It has been found that when 50 percent of the acidic component is added with the diol, the remainder of the component may be added dropwise over a period of ¼ hour to about 6 hours.

It has been found that if the acidic component is not added incrementally it tends to polymerize and the resulting polymer builds up in the reaction mixture and substantially reduces the yield of the reaction. The equipment then becomes clogged with polymer and it becomes very difficult to purify the reaction product. When the acidic component is added in one portion, the yield of monomer is much lower than with the method described above.

If desired, a solvent may be used to azeotrope the water resulting from the diol-acidic compound reaction. The reaction is driven to completion easier when the azeotroping solvent is used. Any aliphatic, cycloaliphatic, or aromatic hydrocarbon solvent may be used. Examples of solvents which are particularly useful are hexane, pentane, cyclopentane, cyclohexane, benzene, toluene, xylene, or mixtures of any of the above. The preferred solvent is cyclohexane. If it is desired to use the solvent, the reaction mixture may contain from about 1 percent to about 60 percent by weight of the solvent.

It is noted that the novel compounds prepared by the above described process may be homopolymerized in the presence of free-radical catalysts or by irradiation, or may be copolymerized with other monomers such as acrylic monomers, such as alkyl acrylates and alkyl methacrylates, or may be added to other polymers and used as mixtures and co-cured together. Various polymers which may be added to the novel acrylic monomers are polyalkyl acrylates, such as poly(ethyl acrylate), poly(2-ethylhexyl acrylate), and poly(butyl acrylate) to form more flexible product and vinyl polymers and copolymers such as vinyl chloride-vinyl acetate copolymers which also form more flexible products. Cellulose polymers such as half-second cellulose acetate-butyrate may be co-cured with the acrylic monomers of this invention to increase the flexibility of the resulting products. Thus, the compound of this invention may be mixed with other monomers or polymers and the mixture may then be co-cured either by using peroxide or by subjecting the mixture to actinic light or to ionizing irradiation. The preferred embodiments of this invention entail the curing of the novel compounds of this invention or of mixtures of the compound by actinic light or by ionizing irradiation.

As the monomers prepared in this manner are extremely radiation-sensitive, and since radiation-sensitivity is both difficult to achieve and to predict, a feature of this invention is to polymerize the monomers herein by subjecting them to ionizing irradiation.

The term "irradiation," as used herein, means high energy radiation and/or the secondary energies resulting from conversion of electrons or other particle energy to X-rays or gamma radiation. While various types of irradiation are suitable for this purpose, such as X-ray and gamma rays, the radiation produced by accelerated high energy electrons has been found to be very conveniently and economically applicable and to give very satisfactory results. However, regardless of the type of radiation and the type of equipment used for its generation or application, the use thereof in the practice of the invention as described herein is contemplated as falling within the scope of this invention so long as the ionization radiation is equivalent to at least about 100,000 electron volts.

While there is no upper limit to the electron energy that can be so applied advantageously, the effects desired in the practice of this invention can be accomplished without having to go to above about 20,000,000 electron volts. Generally, the higher the electron energy used, the greater is the depth of penetration into the massive structure of the materials to be treated. For other types of radiation, such as gamma and X-rays, energy systems equivalent to the above range of electron volts are desirable.

It is intended that the term "irradiation" include what has been referred to in the prior art as "ionizing radiation" which has been defined as radiation possessing an energy at least sufficient to produce ions or to break chemical bonds and thus includes also radiations such as "ionizing particle radiation" as well as radiations of the type termed "ionizing electromagnetic radiation."

The term "ionizing particle radiation" has been used to designate the emission of electrons or highly accelerated nuclear particles such as protons, neutrons, alpha-particles, deuterons, beta-particles, or their analogs, directed in such a way that the particle is projected into the mass to be irradiated. Charged particles can be accelerated by the aid of voltage gradients by such devices as accelerators with resonance chambers, Van der Graaff generators, betatrons, synchrotrons, cyclotrons, etc. Neutron radiation can be produced by bombarding a selected light metal such as beryllium with positive particles of high energy. Particle radiation can also be obtained by the use of an atomic pile, radioactive isotopes or other natural or synthetic radioactive materials.

"Ionizing electromagnetic irradiation" is produced when a metallic target, such as tungsten, is bombarded with electrons of suitable energy. This energy is conferred to the electrons by potential accelerators of over 0.1 million electron volts (mev.). In addition to irradiation of this type, commonly called X-ray, an ionizing electromagnetic irradiation suitable for the practice of this invention can be obtained by means of a nuclear reactor (pile) or by the use of natural or synthetic radioactive material, for example, cobalt 60.

Various types of high power electron linear accelerators are commercially available, for example, the ARCO type travelling wave accelerator, model Mark I, operating at 3 to 10 million electron volts, such as supplied by High Voltage Engineering Corporation, Burlington, Mass., or other types of accelerators as described in U.S. Pat. No. 2,763,609 and in British Pat. No. 762,953 are satisfactory for the practice of this invention.

The monomers described herein will polymerize acceptably using any total dosage between about 0.2 megarad and about 20 megarads. A "rad" is defined as that amount of radiation required to supply 100 ergs per gram of material being treated, and a "megarad" is $10^6$ rads. The total dosage is the total amount of irradiation received by the monomer. It has been found that the monomers of this invention will polymerize to hard, mar-resistant and stain-resistant films at a total dosage of less than 4 megarads. The preferable total dosage used is from about 0.5 megarad to about 10 megarads.

The monomers of this invention may also be cured by adding free-radical catalysts to the monomers and heating the resulting mixtures to cure. Any conventional free-radical catalyst may be used such as organic peroxides, organic hydroperoxides, or esters thereof. Examples are benzoyl peroxide, tertiary-butyl perbenzoate, tertiary-butyl hydroperoxide, cumene hydroperoxide, azobis(isobutyronitrile) and the like. The catalysts are generally used in amounts of about 0.1 percent to about 5 percent by weight of the monomer or mixtures of monomers.

The monomers and catalysts may be heated to cure. Although curing temperatures will vary from monomer to monomer, generally temperatures from about 75° F. to about 300° F. are used to bring about the free-radical cure of the monomers.

In many instances, it may be desirable to polymerize without the addition of external heat in which cases it is customary to add an accelerator to the system. Suitable accelerators include cobalt salts, such as cobalt octoate or cobalt naphthenate and amine accelerators such as N, N-dimethylaniline, N-ethyl-N-hydroxyethyl-m-ethylaniline and N-propyl-N-hydroxyethyl-m-methylaniline.

The acrylic monomers may also be co-cured with various other interpolymerizable ethylenically unsaturated monomers or with polymeric materials using the above-described free-radical mechanisms.

The polymers or interpolymers formed by the polymerization of the new compounds of this invention and the interpolymerization of mixtures of said compounds have great utility as coatings for all types of substrates. They may be used as protective coatings for wood to form panels for walls, as coatings on plastics—to form floor tiles, as coatings on metals such as aluminum and steel panels and as coatings for other substrates, scratch-resistance, mar-resistance, water-resistance and chemical-resistance (to acids and bases), and the cured coatings have a high degree of crosslinking.

The coatings may be formed by applying the monomer onto a substrate by any conventional coating means, such as roller coating, curtain coating, brushing, spraying, etc. The coated article may then be cured either by adding peroxide to the coating, or by subjecting the coating to actinic light or to ionizing irradiation. It is noted that many of the monomers have extremely low viscosity, thus insuring easy application if the product is to be used as a coating.

The use of ionizing irradiation to polymerize the monomers is preferred as this method makes it possible to polymerize the coatings at extremely high speeds and thus eliminate the time consuming baking steps, and as the use of ionizing irradiation requires no heating, the danger of high temperatuers damaging a heat-sensitive substrate is eliminated.

It is also noted that the use of ionizing irradiation requires no solvents, thus reducing the danger of poisonous and explosive solvent vapors and that the coatings formed by the use of ionizing irradiation are more highly crosslinked and are generally stronger coatings than the conventionally cured coatings.

The following examples set forth specific embodiments of the instant invention, however the invention is not to be construed as being limited to these embodiments for there are, of course, numerous possible variations and modifications. All parts and percentages in the examples as well as throughout the specification are by weight unless otherwise indicated.

EXAMPLE 1

An acrylic monomer was prepared s follows:

A reactor was charged with 7140 grams of hydroxypivalyl hydroxypivalate having the formula $$\text{HOCH}_2\overset{\overset{\displaystyle CH_3}{|}}{\underset{\underset{\displaystyle CH_3}{|}}{C}}\text{CH}_2\text{OCO}-\overset{\overset{\displaystyle CH_3}{|}}{\underset{\underset{\displaystyle CH_3}{|}}{C}}-\text{CH}_2\text{OH}$$

1190 grams of cyclohexane, 1324 grams of acrylic acid, 62.2 grams of sulfuric acid, and 124.4 grams of hydroquinone. The reactants were heated to reflux at 200° F. and 3972 grams of acrylic acid were added dropwise over a period of 30 minutes at 208° F. The reaction was run for an additional 4 hours during which time 2730 grams of cyclohexane were added and 1235 grams of water were distilled off. The final product, acryloxypivalyl acryloxypivalate, was obtained in 90 percent yields after purification by washing.

EXAMPLE 2

A radiation-sensitive monomer was prepared as follows:

A reaction vessel was charged with 204 grams of hydroxypivalyl hydroxypivalate, 47.4 grams of methacrylic acid, 3.9 grams of hydroquinone, 1.9 grams of sulfuric acid, and 50 grams of cyclohexane. The reactants were heated to reflux at 100° C., and 142.1 grams of methacrylic acid were added dropwise over a period of 35 minutes. The reaction was run for an additional 4½ hours during which time 100 cubic centimeters of cyclohexane were added and 28.6 grams of water were distilled out. The final product, after purification, was methacryloxypivalyl methacryloxypivalate.

EXAMPLE 3

A radiation-sensitive monomer was prepared as follows:

A reaction vessel was charged with 204 grams of hydroxypivalyl hydroxypivalate, 19.8 grams of acrylic acid, 23.7 grams of methacrylic acid, 3.8 grams of hydroquinone 1.9 grams of sulfuric acid, and 50 grams of cyclohexane. The reactants were heated to 99° C. and 59.5 grams of acrylic acid and 71.1 grams of methacrylic acid were added dropwise over a period of 30 minutes. The reaction was continued for 5 hours during which time 85 cubic centimeters of cyclohexane were added and 34.5 grams of water were collected. The resulting acrylate-methacrylate was isolated and purified in a manner similar to the monomers described in Examples 1 and 2.

EXAMPLE 4

Acryloxypivalyl acryloxypivalate formed by the method of Example 1 was cured by the following method:

A steel plate was covered with a composition comprising 100 parts of the acryloxypivalyl acryloxypivalate of Example 1 (after the hydroquinone had been removed) and 1 part of cumene hydroperoxide. The composition was heated in a nitrogen atmosphere at 170° F. for 30 minutes. The resulting cured product was a hard, mar-resistant and stain-resistant film.

EXAMPLE 5

The acrylic monomers of Examples 1, 2 and 3 were cured by subjecting them to ionizing irradiation in the following manner:

The monomers were applied to aluminum panels and subjected to electron beam impingement at an accelerating potential of 400 kilovolts and a tube current of 16 milliamps. The films received a total dosage of 4 megards. The cured films were found to have excellent mar-resistance, were extremely hard and were resistant to staining by ink, thimersoal, and mustard.

EXAMPLE 6

A mixture of 75 parts of the acryloxypivalyl acryloxypivalate prepared as in Example 1 and 25 parts of 2-ethylhexyl acrylate were copolymerized by subjecting the mixture to electron beam impingement at an accelerating potential of 400 kilovolts and a tube current of 16 milliamps. The total dosage received by the mixture was 4 megarads. The resulting copolymer was hard, mar-resistant and was only very slightly stained by ink, thimerosal, and mustard.

According to the provisions of the patent statutes, there is described above the invention and what are now considered to be its best embodiments. However, within the scope of the appended claims, it is to be understood that the invention can be practiced otherwise than as specifically described.

What is claimed is:

1. A polymerizable compound having the formula $$CH_2=\underset{\underset{\displaystyle R_9}{|}}{\overset{\overset{\displaystyle R_7}{|}}{C}}-COO\underset{\underset{\displaystyle R_8}{|}}{\overset{\overset{\displaystyle }{|}}{C}}-(CH_2)_k\left(\underset{\underset{\displaystyle R_2}{|}}{\overset{\overset{\displaystyle R_1}{|}}{C}}\right)_l-(CH_2)_m-O-CO(CH_2)_n-\left(\underset{\underset{\displaystyle R_4}{|}}{\overset{\overset{\displaystyle R_3}{|}}{C}}\right)_q-(CH_2)_q-\underset{\underset{\displaystyle R_6}{|}}{\overset{\overset{\displaystyle R_5}{|}}{C}}OOC-\underset{\underset{\displaystyle R_{10}}{|}}{\overset{\overset{\displaystyle }{|}}{C}}=CH_2$$

wherein $R_1$, $R_2$, $R_3$, and $R_4$ are selected from the group consisting of H, alkyl, aryl, cycloalkyl, substituted alkyl, substituted aryl and substituted cycloalkyl groups.

$R_5$, $R_6$, $R_7$ and $R_8$ are selected from the group consisting of H, alkyl, aryl, and cycloalkyl groups.

$R_9$ and $R_{10}$ are selected from the groups consisting of

H, alkyl groups containing from 1 to 2 carbon atoms, halo-substituted alkyl groups containing from 1 to 2 carbon atoms and halogen, and $k, l, m, n, p$ and $q$ are numerals having values from 0 to 5.

2. The compound of claim 1 wherein the compound is acryloxypivalyl acryloxypivalate wherein $R_1$, $R_2$, $R_3$, and $R_4$ are $CH_3$ radicals, $R_5$, $R_6$, $R_7$, $R_8$, $R_9$ and $R_{10}$ are H, and $m, l$ and $q$ are 1 and $k, n$ and $p$ are 0.

3. The compound of claim 1 wherein the compound is methacryloxypivalyl methacryloxypivalate wherein $R_1$, $R_2$, $R_3$, $R_4$, $R_9$ and $R_{10}$ are $CH_3$ radicals and $R_5$, $R_6$, $R_7$ and $R_8$ are H and $l, m$ and $q$ are 1 and $k, n$ and $p$ are 0.

4. A mixture of polymerizable compounds of claim 1.

5. The mixture of claim 4 comprising acryloxypivalyl acryloxypivalate and methacryloxypivalyl methacryloxypivalate.

6. The method of producing the compound of claim 1 which comprises reacting a diol having the formula:

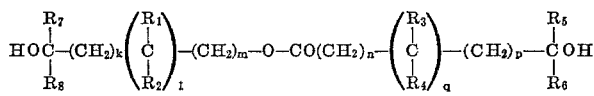

wherein $R_1$, $R_2$, $R_3$ and $R_4$ are selected from the group consisting of H, alkyl, aryl, cycloalkyl, substituted alkyl, substituted aryl and substituted cycloalkyl groups, $R_5$, $R_6$, $R_7$ and $R_8$ are selected from the group consisting of H, alkyl, aryl, and cycloalkyl groups, $k, l, m, n, q$ and $p$ are numerals having values from 0 to 5; with an acidic acrylic compound selected from the group consisting of acrylic acid, methacrylic acid and the acid anhydrides and acid chlorides of acrylic acid and methacrylic acid wherein the reaction is carried out in the presence of an acid catalyst.

7. The method of claim 6 wherein the acidic acrylic compound is added to the diol incrementally.

8. The method of claim 7 wherein up to about ½ of the total amount of acidic acrylic compound is added with the diol and the remainder of the acidic acrylic compound is added incrementally over a period of about ¼ to about 6 hours.

9. The method of claim 7 wherein the reaction is carried out at a temperature from about 50° C. to about 150° C.

10. The method of claim 7 wherein an acid catalyst and an inhibitor are present during the reaction.

11. The method of polymerizing the compounds of claim 1 by subjecting said compounds to ionizing irradiation of from about 0.2 to about 20 megarads.

12. The method of claim 11 wherein the compounds of claim 1 are subjected to from about 0.5 to about 10 megarads.

13. The method of polymerizing the compounds of claim 1 comprising subjecting said compounds to actinic light.

14. The product produced from the method of claim 11.

15. The method of polymerizing the compounds of claim 1 comprising heating in the presence of free-radical catalysts.

16. The method of polymerizing the compounds of claim 1 comprising adding free-radical catalysts and accelerators.

17. The method of copolymerizing a mixture of the compounds of claim 1 and other copolymerizable ethylenically unsaturated monomers comprising subjecting said mixture to ionizing irradiation of about 0.2 to about 20 megarads.

18. The method of copolymerizing a mixture of the compounds of claim 1 and other copolymerizable ethylenically unsaturated monomers comprising heating in the presence of a free-radical catalyst.

19. The method of copolymerizing a mixture of the compounds of claim 1 and other copolymerizable ethylenically unsaturated monomers comprising adding a free-radical catalyst and an accelerator.

20. The method of co-curing a mixture of the compounds of claim 1 and the polymers selected from the group consisting of polyalkyl acrylates, vinyl polymers, vinyl copolymers, and cellulose polymers comprising subjecting said materials to ionizing irradiation of about 0.2 to about 20 megarads.

21. The method of co-curing a mixture of the materials of the compounds of claim 1 and the polymers selected from the group consisting of polyalkyl acrylates, vinyl polymers, vinyl copolymers and cellulose polymers comprising subjecting said materials to actinic light.

22. The method of co-curing a mixture of the compounds of claim 1 and the polymers selected from the group consisting of polyalkyl acrylates, vinyl polymers, vinyl copolymers and cellulose polymers comprising heating in the presence of a free-radical catalyst.

23. The method of co-curing a mixture of the compounds of claim 1 and the polymers selected from the group consisting of polyalkyl acrylates, vinyl polymers, vinyl copolymers and cellulose polymers comprising adding a free-radical catalyst and an accelerator.

References Cited
UNITED STATES PATENTS 3,455,802   7/1969   D'Alelio _____ 204—159.19

JOSEPH L. SCHOFER, Primary Examiner

J. KIGHT, Assistant Examiner

U.S. Cl. X.R.

260—78.5, 86.1, 860, 872; 204—159.16, 159.22